United States Patent
Rogers

(10) Patent No.: US 10,795,943 B1
(45) Date of Patent: Oct. 6, 2020

(54) THREE-DIMENSIONAL NETWORK MAPPING SYSTEM AND METHOD

(71) Applicant: Teal Rainsky Rogers, Burlingame, CA (US)

(72) Inventor: Teal Rainsky Rogers, Burlingame, CA (US)

( * ) Notice: Subject to any disclaimer, the term of this patent is extended or adjusted under 35 U.S.C. 154(b) by 28 days.

(21) Appl. No.: 15/805,615

(22) Filed: Nov. 7, 2017

Related U.S. Application Data

(63) Continuation-in-part of application No. 13/962,405, filed on Aug. 8, 2013, now Pat. No. 10,372,794.

(51) Int. Cl.
| | |
|---|---|
| *G06F 17/20* | (2006.01) |
| *G06F 16/904* | (2019.01) |
| *G06F 3/0481* | (2013.01) |
| *G06F 16/24* | (2019.01) |
| *G06F 16/26* | (2019.01) |
| *G06F 16/44* | (2019.01) |
| *G06F 16/2457* | (2019.01) |

(52) U.S. Cl.
CPC ........ *G06F 16/904* (2019.01); *G06F 3/04815* (2013.01); *G06F 16/24* (2019.01); *G06F 16/24578* (2019.01); *G06F 16/26* (2019.01); *G06F 16/444* (2019.01)

(58) Field of Classification Search
CPC .. G06F 16/904; G06F 16/26; G06F 16/24578; G06F 16/444; G06F 16/24; G06F 3/04815
See application file for complete search history.

(56) References Cited

U.S. PATENT DOCUMENTS

| | | | |
|---|---|---|---|
| 6,205,485 B1 | 3/2001 | Kikinis | |
| 6,300,957 B1 | 10/2001 | Rao et al. | |
| 6,470,383 B1 * | 10/2002 | Leshem | G06F 11/32 709/223 |
| 6,484,148 B1 * | 11/2002 | Boyd | G06Q 30/02 340/8.1 |
| 8,065,658 B1 * | 11/2011 | Bali | G06F 8/70 717/113 |
| 8,111,255 B2 | 2/2012 | Park | |
| 8,456,467 B1 | 6/2013 | Hickman et al. | |
| 8,694,531 B1 * | 4/2014 | Stearns | G06F 16/635 707/767 |
| 9,436,760 B1 * | 9/2016 | Tacchi | G06F 16/3344 |
| 2002/0174087 A1 | 11/2002 | Hao et al. | |

(Continued)

OTHER PUBLICATIONS

T. Munzner et al., "Visualizing the Structure of the World Wide Web in 3D Hyperbolic Space," Available at http://graphics.stanford.edu/papers/webviz/htmlnosplit/ (retrieved Jun. 18, 2015) (Year: 2000).*

(Continued)

*Primary Examiner* — Shahid K Khan
(74) *Attorney, Agent, or Firm* — Jerry Haynes Law

(57) ABSTRACT

A three-dimensional network mapping system that includes a database; a data gathering system interfacing with the database; and a user interface interfacing with the database, the user interface adapted to form a three-dimensional data node map by orienting the data nodes in an organized three-dimensional structure representing a layout of the data nodes. A three-dimensional network mapping method is also disclosed.

36 Claims, 6 Drawing Sheets

(56) References Cited

U.S. PATENT DOCUMENTS

| | | |
|---|---|---|
| 2003/0130982 A1* | 7/2003 | Kasriel .................. G06Q 30/02 |
| 2003/0208323 A1 | 11/2003 | Hao et al. |
| 2007/0276807 A1* | 11/2007 | Chen ..................... G06F 16/156 |
| 2008/0235622 A1 | 9/2008 | Chand |
| 2008/0266289 A1 | 10/2008 | Park |
| 2009/0089714 A1 | 4/2009 | Blake et al. |
| 2010/0153372 A1 | 6/2010 | Kim |
| 2011/0221745 A1 | 9/2011 | Goldman et al. |
| 2012/0158715 A1 | 6/2012 | Maghoul et al. |
| 2013/0024764 A1 | 1/2013 | Lou et al. |
| 2013/0090101 A1 | 4/2013 | Park et al. |
| 2013/0144566 A1 | 6/2013 | De Biswas |
| 2013/0166568 A1* | 6/2013 | Binkert ................. G06F 16/245 707/741 |
| 2015/0310643 A1* | 10/2015 | Rzeszotarski ........... G06T 13/20 345/440 |

OTHER PUBLICATIONS

Wood et al, Hyperspace: A world-wide web visualizer and its implications for collaborative browsing and software agents, HCI '95 Year: 1995).*

T. Munzer et al., "Visualizing the Structure of the World Wide Web in 3D Hyperbolic Space," Aug. 31, 2000[online] [available at http://graphics.stanford.edu/papers/webviz/htmlnosplit/] (retrieved Jun. 18, 2015).

J. Lamping et al., "The Hyperbolic Browser: A Focus+Context Technique for Visulaizing Large Hierarchies," (1996).

* cited by examiner

THREE-DIMENSIONAL NETWORK MAPPING SYSTEM AND METHOD

CROSS-REFERENCE TO RELATED APPLICATIONS

This application is continuation-in-part of application Ser. No. 13/962,405, filed Aug. 8, 2013 entitled "Three-Dimensional Network Mapping System and Method" which application is incorporated by reference herein in its entirety.

FIELD OF THE INVENTION

Illustrative embodiments of the disclosure generally relate to systems and methods for mapping large and/or complex datasets. More particularly, illustrative embodiments of the disclosure relate to a three-dimensional network mapping system and method for three-dimensional mapping of data stored in a database.

BACKGROUND OF THE INVENTION

Many modern computer systems generate very large and/or complex maps of relationships between data stored in databased. Some examples of large datasets include website data on the internet, the relationships between people on a social network, advertising network data, heuristic code analysis applications, and product marketplaces. All of these applications, and others, become too complex to visualize on a computer screen using classical two-dimensional methods. In some applications it can be desirable to visualize complex datasets in a way that highlights important relationships in the data and/or that a user can understand and navigate.

In computer graphics, objects are represented three-dimensionally on a two-dimensional computer screen, enabling a viewer to comprehend more than one view of the object. Three-dimensional objects are generated using a collection of points in three-dimensional space and may be connected with triangles, lines or other entities. Methods are known for generating three-dimensional object data models which utilize point clouds and geometric shapes.

A three-dimensional network mapping system and method for three-dimensional mapping of web pages from the internet or other network may be desirable so that that data becomes visually navigable and highlights useful relationships in that data, as well as for other applications.

SUMMARY OF THE INVENTION

Illustrative embodiments of the disclosure are generally directed to a three-dimensional network mapping system. An illustrative embodiment of the three-dimensional network mapping system includes a database; a data gathering system interfacing with the database, the data gathering system adapted to gather data and send it to the database; and a user interface interfacing with the database, the user interface adapted to form a three-dimensional data map by orienting the data in an organized three-dimensional organizational structure representing a layout of the data in a simulated three-dimensional environment.

Illustrative embodiments of the disclosure are further generally directed to a three-dimensional network mapping method. An illustrative embodiment of the method includes gathering data into a database and forming a three-dimensional data map by orienting the data in an organized three-dimensional structure representing a layout of the data in three-dimensional space. Methods have been described that are capable of mapping datasets in some form of three-dimensional space in the past, but the methods described here are unique because they can be used either with or without hard surfaces, such as the surface of a sphere, and still organize the data in a way that highlights important relationships to the user. This more free-form structure allows the user to understand much larger datasets and also to be able to focus in on smaller regions depending on the user's specific needs.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is non-limiting and is not necessarily to be construed as preferred or advantageous over other implementations. All of the implementations described below are exemplary implementations provided to enable persons skilled in the art to practice the disclosure and are not intended to limit the scope of the appended claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description.

Figure 1:
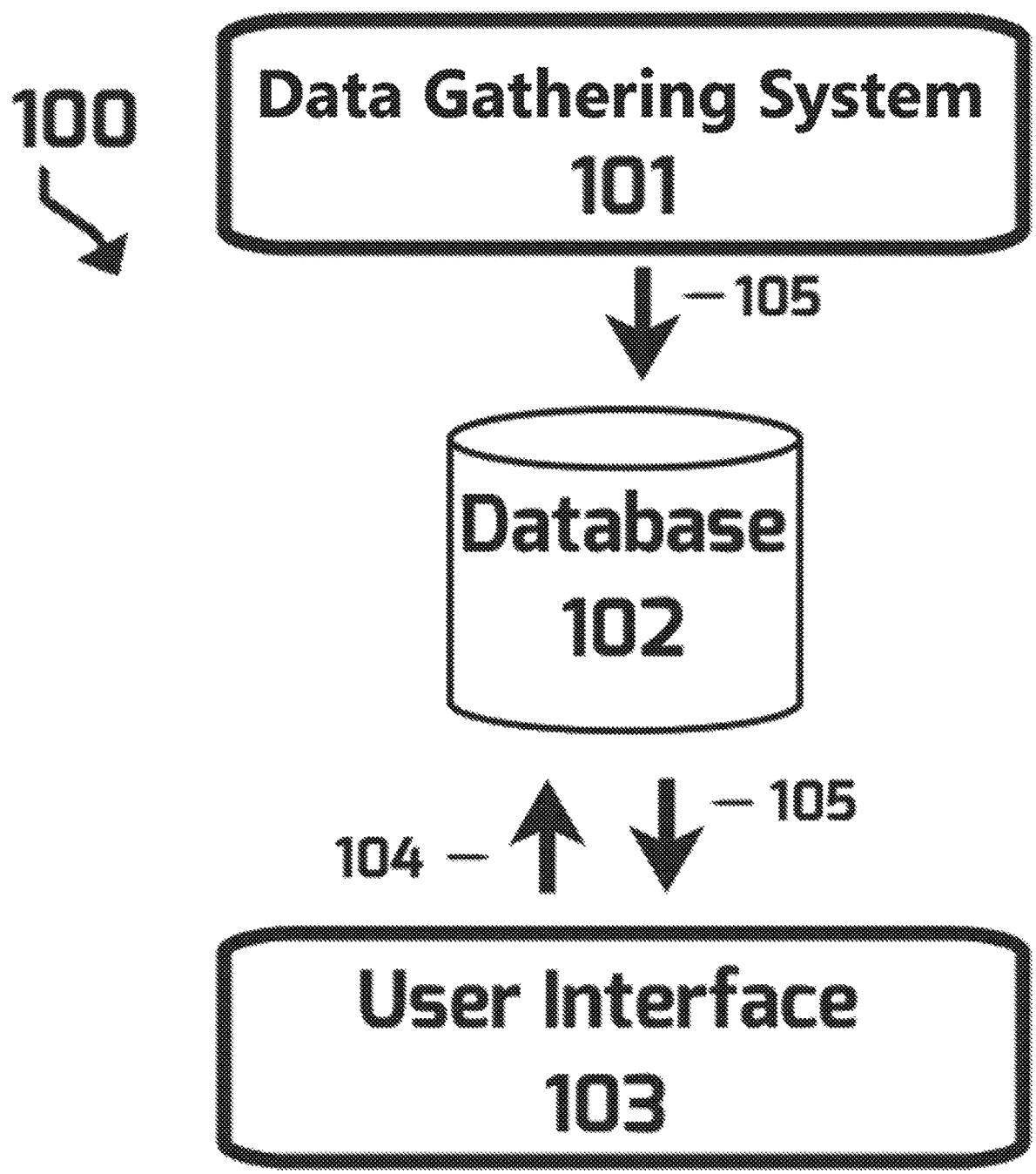
FIG. 1 is a block diagram which illustrates an illustrative embodiment of the three-dimensional network mapping system and method.

Referring initially to FIG. 1 of the drawings, an illustrative embodiment of the three-dimensional network mapping system, hereinafter system is generally indicated by reference numeral 100. As will be hereinafter described, the system 100 may be adapted to retrieve data 105 which relates to some aspect of a physical or digital problem domain and generate a three-dimensional network map 500 which represents the layout of the data, and present the linked websites to the user in the form of a three-dimensional network map 500 (FIG. 5) in space on a display screen 103*a* (FIG. 5) of a user interface 103 such as a computer, smart phone or tablet, for example and without limitation. The system 100 may be built on a cross-platform game engine such as a 3D (three-dimensional) engine known as Unity 3D, for example and without limitation.

It will be recognized and understood that the principles of the system and method 100 that will be described herein may be amenable to using data that comes from a wide range of applications and sources. Some examples of logical data sources are websites on the internet, internal networks (such as routers and switches), visualizing the internal structures of software applications, heuristic code analysis applications, product marketplaces (such as online shopping carts), advertising networks, the relationships between people on a social network, or songs on a music listening platform, for example and without limitation. The system 100 can be adapted to visualize data from a wide range of sources, and some types of data can be organized very differently than other types. This system 100 is designed to be adaptable to different types of data that are organized differently.

According to implementation of the system 100, data nodes may be attracted to each other when there is a link between them. A data node is a particular item in the database, for example in the case of a song database a data node can represent a particular song. A link can be characterized by any type of relationship between data nodes. Some types of data sources may have more than one type of link between data nodes. Depending on the data source it can be more appropriate to call a "link" between nodes an "edge" between nodes, for the purposes of this method the two terms can be considered synonyms. As an example and without limitation, in the case that the data being displayed is websites on the internet a link can represent a hyperlink between web pages, or in the case that the data being displayed represents a social network a link can represent whether two people have added each other as friends on that network. The linked data nodes may be repelled by any non-linked data nodes which approach them in the simulated three-dimensional space. Other simulated physical forces may also be applied to the data nodes, creating an organized three-dimensional structure that represents a layout of the data in the database.

Some data sources may have more than one type of edge that can exist between data nodes, for example songs in a music listening platform might be linked to each other in accordance with genre, band name, which playlists they are added to, or other criteria. In the case that a data source has more than one type of edge the system will have controls allowing the user to select which type of edge they want to use to organize the data. Controls may exist that allow the user to organize the data in accordance with a combination of different edges. In some embodiments there are controls that allow the user to give each type of edge between nodes a different weight in order to highlight useful relationships in the dataset.

As illustrated in FIG. 1, the system 100 may include a data gathering system 101. A database 102 may interface with the data gathering system 101 through a wired and/or wireless interface. The user interface 103 may interface with the database 102 through a wired and/or wireless interface.

The data gathering system 101 may be hosted on a cloud server. In some implementations the data gathering system 101 can be programmed to seek out data from the physical or digital environment, download the data 105 and "fuzz" the data 105. Fuzzing is a method which is used by some data gathering systems to throw away irrelevant bits of data and keep only important data. Other implementations of a data gathering system may involve copying data from one database to make another, less complicated, database. Some datasets may already exist in an appropriate form in the database in which case 101 and 105 will not be in use in that particular incarnation of this method. The data gathering system 101 collects and stores the data 105 in the database 102. The data 105 which the data gathering system 101 collects and stores may include a wide range of information, including the size of the data node, fuzzed or unfuzzed data about the data node, and/or any links to other data nodes and other types of data. The system may be implemented using any type of data gathering system known by those skilled in the art as long as the data gathering system is capable of supplying the required data 105 to the database 102.

The database 102 may be any type of database which is capable of storing the required data 105. In some embodiments, the database 102 may be a distributed "HBase" infrastructure which spreads the database across multiple servers for efficiency. The database 102 stores the data 105 that the data gathering system 101 collects and distributes the data 105 to the user interface 103 when a user (not illustrated) at the user interface 103 requests the data 105 in a three-dimensional format. In some incarnations the database operates without a data gathering system, in those incarnations the database still distributes the data to the user interface 103.

The user interface 103 may connect to the database 102 over the internet. The user interface 103 may be configured to transmit to the database 102 an information packet 104 which requests data 105 that relates to the structure of the data nodes and the links between them which may have been obtained by the data gathering system 101 and stored in the database 102. The information packet 104 may also request data 105 which specifies other details about the data that were requested by the user and are to be downloaded to the user interface 103. The database 102 is adapted to respond to the information packet 104 by transmitting the data 105 to the user interface 103. The user interface 103 may be configured to organize the data 105 and display the data 105 to the user in a three-dimensional format. The data gathering system 101, the database 102 and the user interface 103 may include the necessary circuitry, hardware and/or software component or components and elements and structural and/or functional interfaces to implement the functions of facilitating exchange, transfer and processing of the information packets 104 and data 105 as well as to implement the other functions of the data gathering system 101, database 102 and user interface 103 described herein. The database 102 may include any physical device, mechanism or structure which can be touched or manipulated by a user to communicate commands to the system 100.

Figure 2:
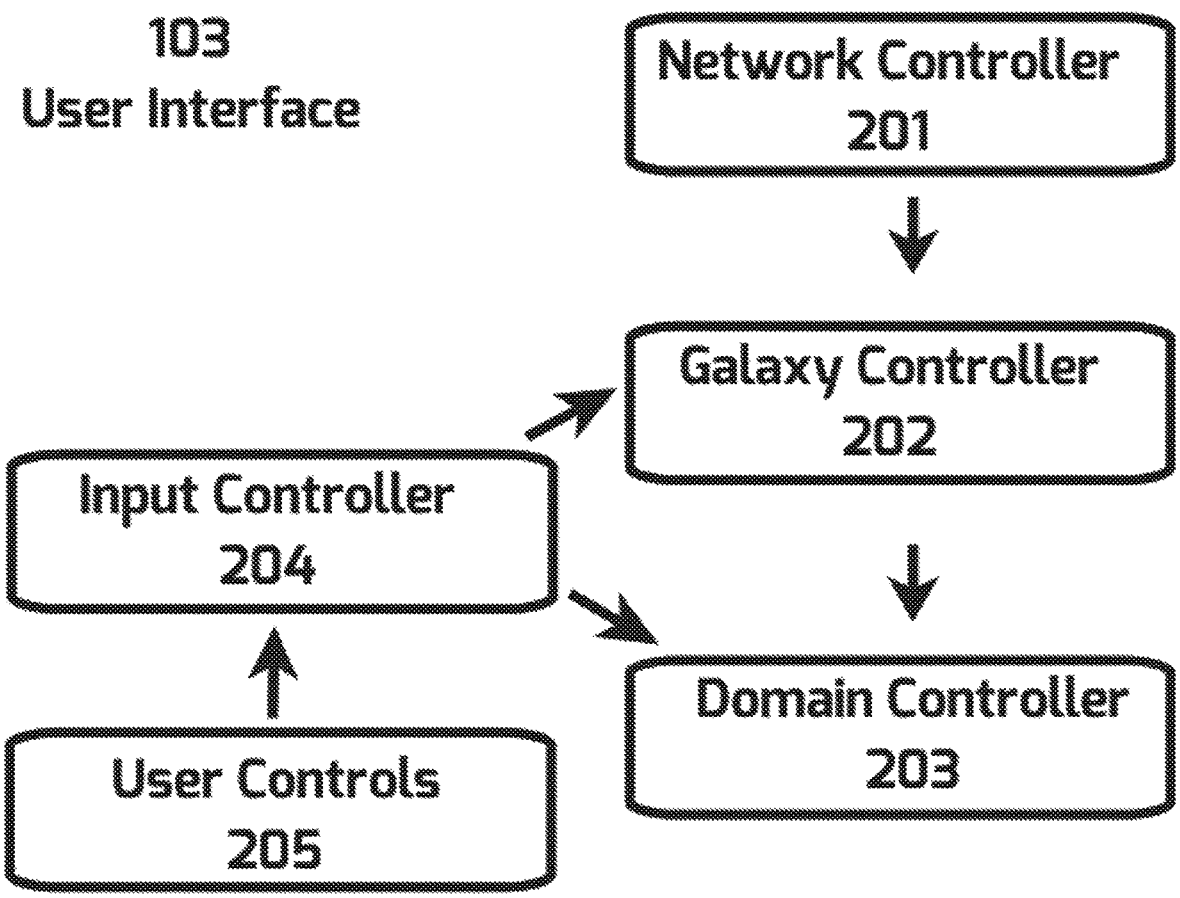
FIG. 2 is a block diagram which illustrates an exemplary user interface of the three-dimensional network mapping system and method.

Referring next to FIG. 2 of the drawings, an exemplary user interface 103 which is suitable for implementation of the system 100 is illustrated. The user interface 103 may include a network controller 201. A galaxy controller 202 may interface with the network controller 201. A domain controller 203 may interface with the galaxy controller 202. An input controller 204 may interface with the galaxy controller 202 and the domain controller 203. The input controller 204 may include user controls 205 which enable a user to operate the system 100.

The network controller 201 of the user interface 103 may communicate with the database 102 (FIG. 1) over the internet. The network controller 201 may transmit information packets 104 to and receive data 105 from the database 102 through a wired and/or wireless interface. The network controller 201 may also maintain a stable connection with the database 102 over the internet. When it has received new data 105 from the database 102, the network controller 201 accesses a receive data component 304 (FIG. 3) on the galaxy controller 202, as will be hereinafter described.

The galaxy controller 202 of the user interface 103 may place the data nodes into three-dimensional space and coordinate the relationships of multiple data nodes or data node groups (referred to as domains) to each other in the three-dimensional space. The galaxy controller 202 may also be adapted to group data nodes together in some situations. The domain controller 203 of the user interface 103 may coordinate the movement and behavior of data nodes and links between data nodes within a group of data nodes.

The input controller 204 of the user interface 103 may process user input. The user controls 205 of the input controller 204 may include controls for rotating the view, zooming in and out, expanding or contracting a field of view, clicking on objects, dragging objects and double-clicking on objects, for example and without limitation. The user controls 205 may vary depending on the type of device (computer/laptop, web browser, smart phone, etc.) on which the system 100 is deployed.

When the user zooms in or out past a certain defined zoom level the input controller 204 may send a message to the galaxy controller 202 telling it to behave in either System View, if the screen has been zoomed in close, or Galaxy View, if it is further away. This allows the user interface 103 to group similar data nodes together when it is desirable to create an interface that is capable of providing the user with both an overview of the data and a more detailed view in accordance with the user's needs at that moment. The data network controller 201, the galaxy controller 202, the domain controller 203, the input controller 204 and the user controls 205 may include the necessary circuitry and/or software component or components and elements and structural and/or functional interfaces to implement the functions of facilitating exchange, transfer and processing of the information and data as well as to implement the other functions described herein.

Figure 3:
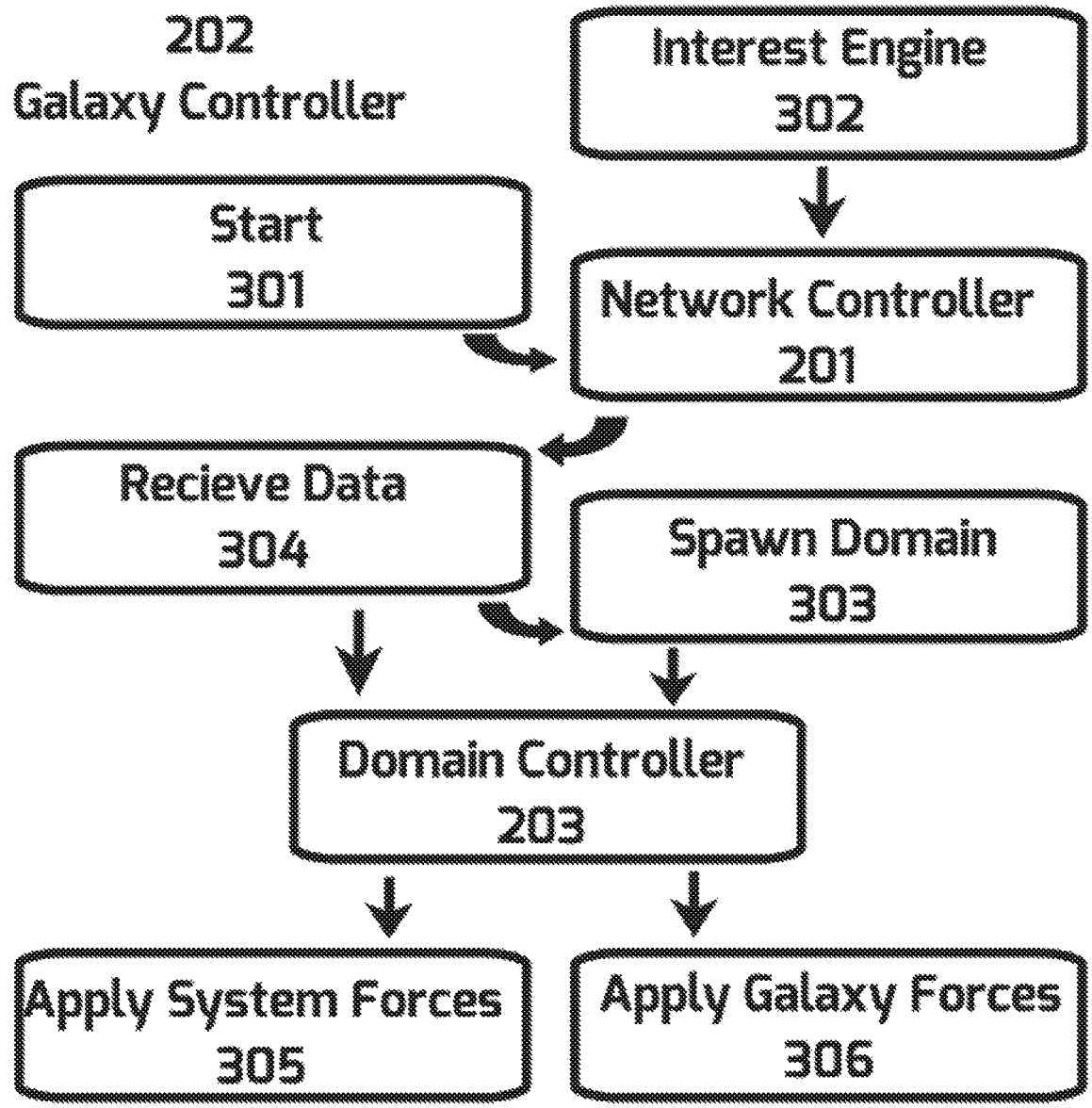
FIG. 3 is a block diagram which illustrates an exemplary galaxy controller of the three-dimensional network mapping system and method.

Referring next to FIG. 3 of the drawings, an exemplary galaxy controller 202 which is suitable for the user interface 103 (FIG. 2) is illustrated. The galaxy controller 202 may include a start component 301 which interfaces with the network controller 201. An interest engine 302 may interface with the network controller 201. A receive data component 304 may interface with the network controller 201. A spawn domain 303 may interface with the receive data component 304. A domain controller 203 may interface with the spawn domain 303 and the receive data component 304. The galaxy controller 202 may also include an apply system forces component 305 and an apply galaxy forces component 306 which interface with the network controller 201. The start component 301, the interest engine 302, the spawn domain 303, the receive data component 304, the apply system forces component 305 and the apply galaxy forces component 306 may include the necessary circuitry and/or software component or components and elements and structural and/or functional interfaces to implement the functions of facilitating exchange, transfer and processing of the information and data as well as to implement the other functions described herein.

The start component 301 of the galaxy controller 202 may load a predetermined starting data node. The start component 301 may also transmit a query to the network controller 201 for additional information on the domain.

The interest engine 302 of the galaxy controller 202 may start when the application is initiated and may be configured to run periodically, such as every two seconds, for example and without limitation. The interest engine 302 is responsible for determining which data nodes or data groups are displayed to the user, and for changing the subset of the data that is visible to the user at any particular time. The interest engine 302 may add interest to whichever data node or data group the user is focusing on (currently-focused data node) and may also add a smaller amount of interest to the data nodes that are displaying a link to the currently-focused data node on the screen to the user at that moment. Interest may be stored as a value that is attached to each data node. The interest engine 302 may normalize the total interest values across all domains such that the total interest assigned does not exceed a defined cap. When a data node accumulates sufficient interest value, the interest engine 302 may transmit a request to the network controller 201 to retrieve additional information on that domain. When a data node falls below a defined interest value the interest engine may send a message to the hide domain component 401 (FIG. 4) to remove that data node from the display. In some embodiments, the interest engine 302 may be adapted to add interest to at least one domain according to quantity or length time which the user spends interacting with the domain. Accordingly, the interest engine 302 may utilize a time-based approach which analyzes the domain on which a user is currently or presently focused in time to determine the user's relative interest in the domains.

The receive data component 304 of the galaxy controller 202 may receive data 105 (FIG. 1) from the network controller 201 and transmit the retrieved data 105 to the spawn domain 303. The spawn domain 303 spawns the data 105, or creates the domain and places it onto three-dimensional space, generating a three-dimensional (3D) domain.

The apply system forces component 305 applies simulated physical forces that act on the 3D domain when the user zooms the 3D domain into system view. Simulated physical forces in the 3D environment are created by defining a direction and strength (together these two elements are called a vector) and telling the 3D engine to apply that force to a specific object in 3D space. The apply system forces component 305 may load when the application loads and may continually update the forces periodically (forces may be recalculated as often as 60 times per second, for example and without limitation). The apply system forces component 305 may apply the following simulated physical forces to every 3D domain:

(1). Compression: Force=The domain's position*−1*compression constant;

(2). Cross domain pull/push: Force=h*(r*s/m)−p. This calculation is called for each domain that exists (d) and other domains that also exist (od). Heading (h) is the vector from od to d. (s) is the size (number of data nodes) of d. Repulsion (r) and Pull (p) are constants. (m) is the magnitude of h.

(3). Domain separator: Force=h*(r/m). This calculation is called for each domain that is currently showing data nodes or data groups (d) and other data nodes or data groups that exist (od). Heading (h) is the vector from od to d, ignoring the vertical axis. (m) is the magnitude of h.

The apply galaxy forces component 306 may load when the application loads and may continually update the forces (forces may be recalculated as often as 60 times per second, for example and without limitation). The apply galaxy forces component 306 may apply the forces that act on the domain when the user zooms the 3D domain into galaxy view. The apply galaxy forces component 306 may apply the following forces to every domain:

(1). Compression: Force=The domain's position*−1*compression constant;

(2). Origin force: The position of the current domain in focus (ignoring the vertical component) times the cohesion constant;

(3). Cross domain pull/push: Force=$h*(r*s/m)-p$. This calculation is called for each domain that exists (d) and other domains that also exist (od). Heading (h) is the vector from od to d. (s) is the size (number of data nodes) of d. Repulsion (r) and Pull (p) are constants. (m) is the magnitude of h.

Figure 4:
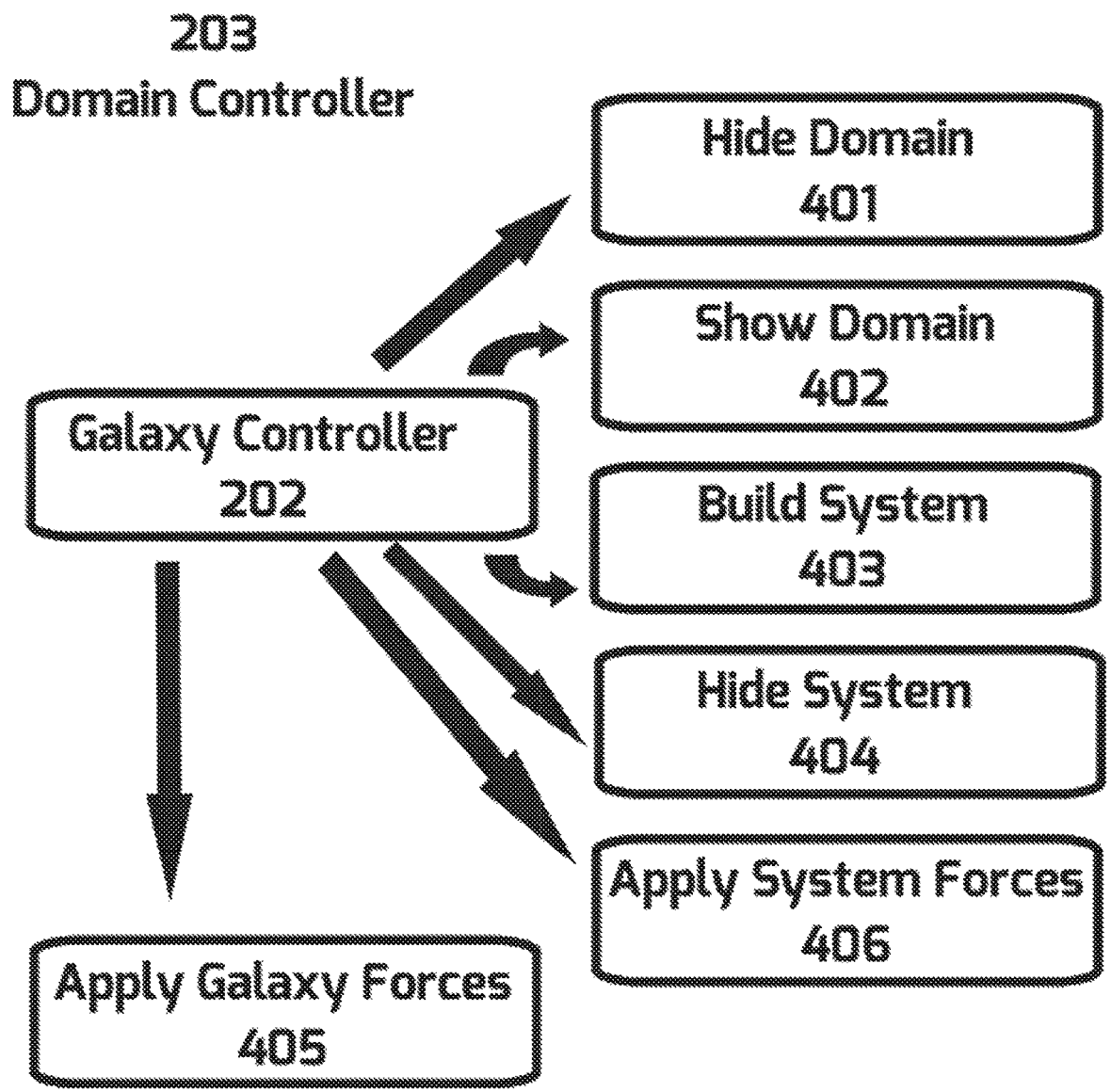
FIG. 4 is a block diagram which illustrates an exemplary domain controller of the three-dimensional network mapping system and method.

Referring next to FIG. 4 of the drawings, an exemplary domain controller 203 suitable for implementation of the user interface 103 (FIG. 2) is illustrated. The domain controller 203 may include a hide domain component 401 and a show domain component 402 which interface with the galaxy controller 202. A build system component 403 and a hide system component 404 may interface with the galaxy controller 202. The domain controller 203 may also include an apply galaxy forces component 405 and an apply system forces component 406 which interface with the galaxy controller 202. The hide domain component 401, the show domain component 402, the build system component 403, the hide system component 404, the apply galaxy forces component 405 and the apply system forces component 406 may include the necessary circuitry and/or software component or components and elements and structural and/or functional interfaces to implement the functions of facilitating exchange, transfer and processing of the information and data as well as to implement the other functions described herein.

The hide domain component 401 may disable all the display elements associated with a 3D domain. The show domain component 402 may enable all the display elements associated with the current domain project. The build system component 403 may hide the domain object and create all the data nodes associated with the current domain object. The build system component 403 may launch the data nodes in a random direction in three-dimensional space, and the simulated physical forces that are applied cause the launched data nodes to structure themselves. The hide system component 404 may delete all the data nodes from view and show the domain object when it receives a message from another component. The apply galaxy forces component 405 may load when the domain is first spawned and may continually periodically update the simulated physical forces (such as 60 times per second, for example and without limitation). The apply galaxy forces component 405 may apply the simulated physical forces that act on the data nodes associated with a domain when the domain is not spawned. In some embodiments, no data nodes may exist in this view; therefore, forces may not be applied to the data nodes. The apply system forces component 406 may load when the domain is first spawned and may continually and periodically update the simulated physical forces (such as 60 times per second, for example and without limitation). The apply system forces component 406 may apply the simulated physical forces that act on the data nodes associated with a domain when the domain is spawned. The apply system forces component 406 may apply the following simulated physical forces to every domain:

(1). Heading: Force on home=$h*c$. (h) is the vector of the domain position excluding the y axis. (c) is the cohesion constant;

(2). Buoyancy: Force=$-y-(s-d)*h*b$. (y) is they value of the position of data node. Surface (s) is a constant. Height of one level (h) is a constant. Depth (d) is how high the object should float. Buoyancy force (b) defines how much effect buoyancy should have and is a constant;

(3). Push/pull to home: Force=$h*(r/m)-c$. Every data node in a domain receives a force attracting them to a particular distance away from the defined center of the domain. In dome embodiments the center of the domain could be a particular "root" data node, in others it could be an average position of all data nodes in the domain. Heading (h) is the vector from the current data node to the center of the domain. Repulsion (r) and cohesion (c) are constants. The magnitude of h is (m);

(4). Repulsion: Force=$h*(r/m)$. This is applied from every data node (p) to every other data node (op). In some embodiments some data nodes may be ignored by this calculation for efficiency or for other reasons. Heading (h) is the vector from p to op. Repulsion (r) is a constant. The magnitude of h is (m).

(5). Pull: Force (from)=$-h*p$; Any two data nodes that are linked are pulled closer to each other. Heading (h) is the vector from the origin of the link to the destination. Pull (p) is a constant;

(6). Pull: Force (to)=$h*p$.

Figure 5:
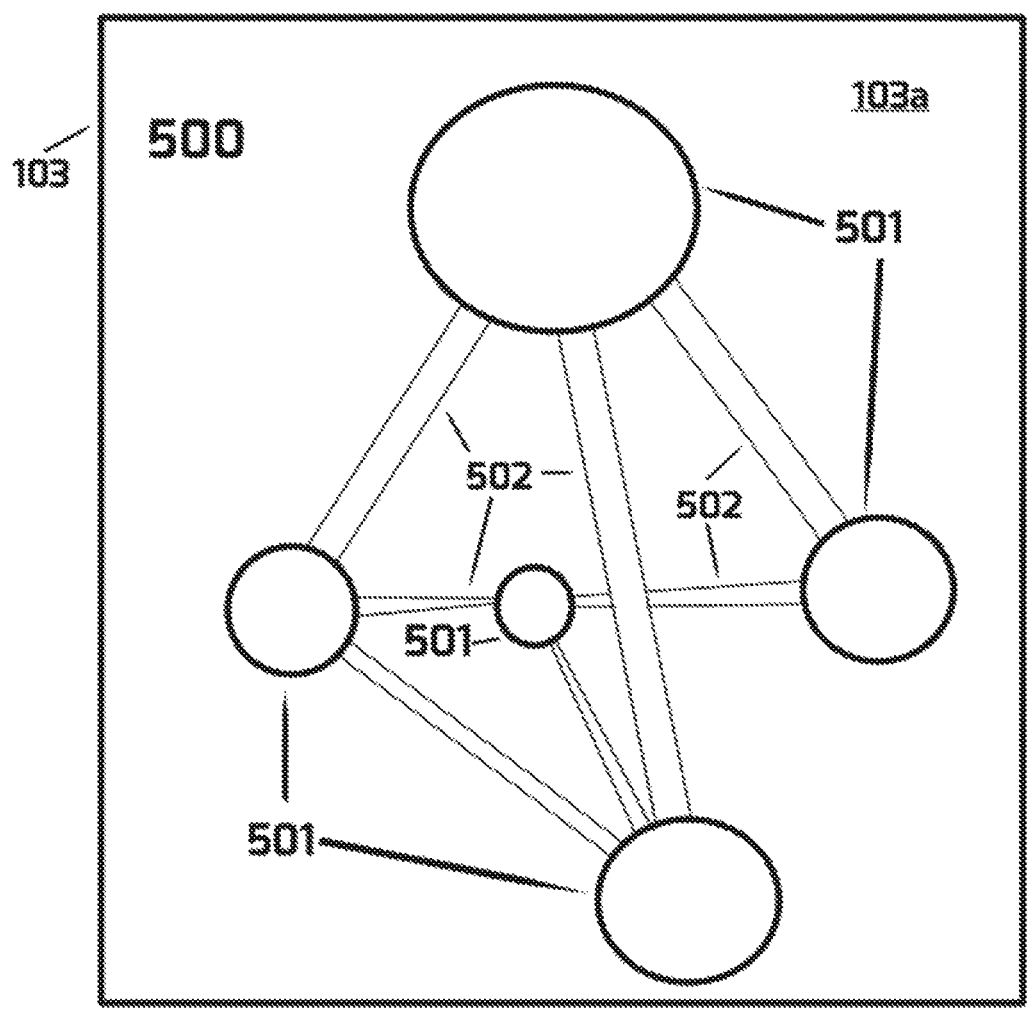
FIG. 5 is an exemplary three-dimensional network map generated according to an illustrative embodiment of the three-dimensional network mapping system and method.

Referring next to FIG. 5 of the drawings, an exemplary three-dimensional network map 500 generated according to an illustrative embodiment of the three-dimensional network mapping system and method 100 is illustrated. In exemplary application, the data gathering system 101 (FIG. 1) gathers data, downloads data 105 and "fuzzes" the data 105. The retrieved data 105 is stored in the database 102. A user (not illustrated) operates the user interface 103 to retrieve selected data 105 from the database 102. The user interface 103 spawns the data 105 and presents the data nodes in a three-dimensional network map 500 in space on a display screen of the user interface 103 by operation of the components which were heretofore described with respect to FIGS. 2-4. The multiple data nodes or domains 501 which are of interest to a user, as determined by the interest engine 302 are oriented in three-dimensional space. Links 502 may connect the data nodes or domains 501 to each other in the three-dimensional network map 500. Depending on the data set there may be different types of links 502 that connect different data nodes in to each other.

Figure 6:
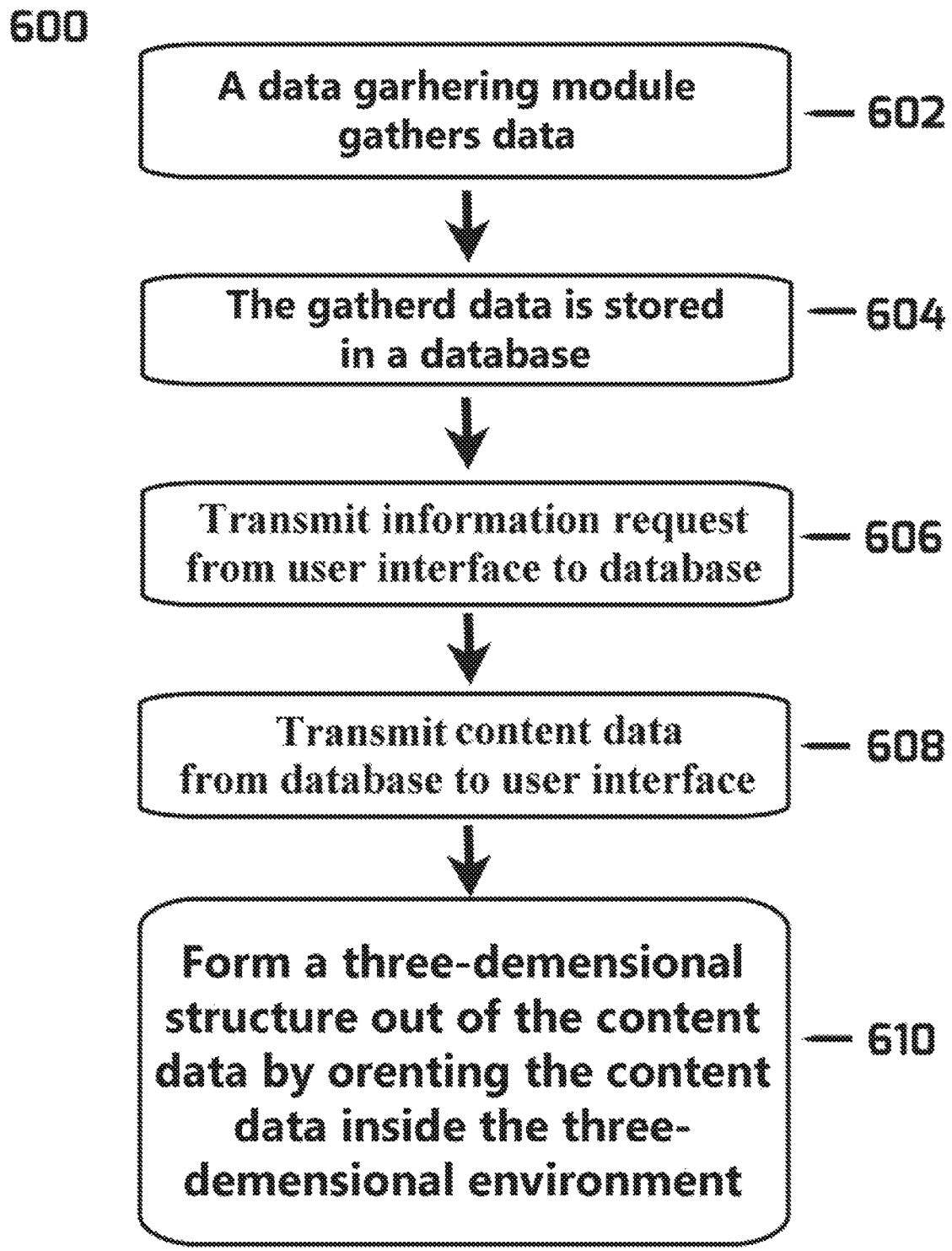
FIG. 6 is a flow diagram of an illustrative embodiment of a three-dimensional network mapping method.

Referring next to FIG. 6 of the drawings, a flow diagram 600 of an illustrative embodiment of a three-dimensional network mapping method is illustrated. In block 602, data relating to a data node may be obtained. In block 604, the data may be stored in a database. In block 606, an information packet may be transmitted from a user interface to a database. The information packet may request data that relates to specific properties of the data node. In block 608, the data may be transmitted from the database to a user interface responsive to the information packet. In block 610, a three-dimensional domain may be formed by orienting the data in an organized three-dimensional structure representing the layout of the data set in three-dimensional space. Additional method steps may include those which were heretofore described with respect to the three-dimensional network mapping system 100 in FIGS. 1-5.

While the embodiments of the disclosure have been described above, it will be recognized and understood that various modifications can be made and the appended claims are intended to cover all such modifications which may fall within the spirit and scope of the disclosure.

What is claimed is:

1. A three-dimensional network mapping system for three-dimensional mapping of data nodes to render data visually navigable and highlight useful relationships in that data, comprising:

a database;

a computer configured to execute:
a data gathering system interfacing with the database, the data gathering system adapted to gather data and send that data to the database; and
software code for a user interface interfacing with the database, the user interface adapted to form a three-dimensional (3D) representation of the data by orienting the data in an organized three-dimensional (3D) structure representing a layout of the data in three-dimensional (3D) space;
wherein the user interface comprises a network controller interfacing with the database, software code for a galaxy controller interfacing with the network controller, and a user input controller interfacing with the galaxy controller and the network controller, the galaxy controller adapted to place the three-dimensional (3D) representation of the data as data nodes and three-dimensional (3D) representations of data links between the data into the three-dimensional space and coordinate relationships of the data to each other in the 3D space, wherein the galaxy controller is further adapted to organize the data with respect to each other in the 3D space by using simulated physics forces and facilitating three-dimensional attraction between the data nodes in the three-dimensional space when at least one of the data links is between the data nodes and three-dimensional repelling between non-linked data nodes in the three-dimensional space;
software code for an Interest Value Engine interfacing with the network controller, the Interest Value Engine adapted to monitor usage and maintain a plurality of interest values corresponding to the data that are periodically adjusted based on respective amounts of time the data has been selected by the user;
wherein the Interest Value Engine is further adapted to: determine a first interest value associated with a first set of data based on an amount of time the first set of data has been currently selected by the user, determine a second interest value that is smaller than the first interest value of one or more other sets of data that are linked via one or more of the data links to the first set of data, normalize the first interest value and the second interest value across the first set of data and one or more other sets of data linked to the first set of data such that a total interest value does not exceed a predefined cap, and transmit a request to the network controller to retrieve additional information on one of the first set of data and the one or more other sets of data when the one of the first set of data and the one or more other sets of data accumulates a certain interest value;
software code for a domain concealment component interfacing with the galaxy controller and the Interest Value Engine, the domain concealment component adapted to hide a 3D representation of the first set of data by disabling all display elements associated with the 3D representation of the first set of data, the Interest Value Engine being further adapted to send a message to the domain concealment component to remove all display elements associated with the 3D representation of the first set of data from display when the first set of data falls below a predefined interest value; and
software code for a domain display component interfacing with the galaxy controller, the domain display component adapted to enable at least one display element associated with the 3D representation of the first set of data, the Interest Value Engine being further adapted to send a message to the domain display component to display the 3D representation of the first set of data when the first interest value of the first set of data rises above the predefined interest value.

2. The system of claim 1 wherein the database comprises an open source, non-relational, distributed database infrastructure.

3. The system of claim 1 wherein the user interface is configured to transmit an information packet to the database requesting the data relating to a link structure and the database is adapted to transmit the data to the user interface responsive to receiving the information packet.

4. The system of claim 1 wherein the user interface connects to the database over an Internet Protocol network.

5. The system of claim 1 wherein the computer is further configured to execute software code for a domain controller interfacing with the input controller and the galaxy controller, the domain controller adapted to coordinate movement and display of the data nodes and links between the data nodes.

6. The system of claim 1 wherein the galaxy controller comprises software code for a spawn domain component interfacing with the network controller, the spawn domain component adapted to place the data nodes into three-dimensional space.

7. The system of claim 6 wherein the computer is further configured to execute software code for a domain controller interfacing with the spawn domain component, the domain controller adapted to coordinate movement of the data nodes and links between them.

8. A three-dimensional network mapping system for three-dimensional mapping of data nodes to render data visually navigable and highlight useful relationships in that data, comprising:
a database;
a computer configured to execute:
software code for a data gathering system interfacing with the database, the data gathering system adapted to gather data and send that data to the database; and
software code for a user interface interfacing with the database, the user interface adapted to form at least one three-dimensional representation of the data by orienting the data in an organized three-dimensional (3D) structure representing a layout of the data nodes in three-dimensional (3D) space and the user interface including:
a network controller interfacing with the database;
software code for a galaxy controller interfacing with the network controller, the galaxy controller having a spawn domain component interfacing with the network controller and adapted to place the data nodes into the three-dimensional space to form the at least one three-dimensional representation of the data, the galaxy controller further adapted to coordinate relationships of the data nodes to each other in the three-dimensional space using simulated physics forces and facilitate three-dimensional attraction between the data nodes in the three-dimensional space when at least one of the data links is between the data nodes and three-dimensional repelling between non-linked data nodes in the three-dimensional space;
software code for a user input controller interfacing with the galaxy controller, wherein the user input controller includes controls for expanding or contracting a field of view,
software code for a domain controller interfacing with the user input controller and the galaxy controller, wherein the domain controller is adapted to coordinate movement of the data nodes in the 3D space;

the galaxy controller further comprises an Interest Value Engine interfacing with the network controller, the Interest Value Engine adapted to monitor usage and maintain a plurality of interest values corresponding to the plurality of data nodes that are periodically adjusted based on respective amounts of time each of the plurality of data nodes has been selected by a user, wherein the Interest Value Engine is further adapted to:

determine a first interest value associated with a first data node of the plurality of data nodes based on an amount of time the first data node has been currently selected by the user, determine a second interest value that is smaller than the first interest value of one or more other data nodes that are linked via one or more data links to the first data node, normalize the first interest value and the second interest value across the first data node and the one or more other data nodes linked to the first data node such that a total interest value assigned to a particular data node does not exceed a predefined cap, and transmit a request to the network controller to retrieve additional information on one of the first data node and the one or more other data nodes when the one of the first data node and the one or more other data nodes accumulates a certain interest value;

software code for a domain concealment component interfacing with the galaxy controller, the domain concealment component adapted to hide a 3D representation of the first data node by disabling all display elements associated with the 3D representation of the first data node, the Interest Value Engine being further adapted to send a message to the domain concealment component to remove the 3D representation of the first data node from display when the first interest value falls below a predefined interest value; and software code for a domain display component interfacing with the galaxy controller, the domain display component adapted to enable display of at least one display element associated with the 3D representation of the first data node, the Interest Value Engine being further adapted to send a message to the domain display component to display the 3D representation of the first data node when the first interest value rises above the predefined interest value.

9. The system of claim 8 wherein the database comprises an open source, non-relational, distributed database infrastructure.

10. The system of claim 8 wherein the user interface is configured to transmit an information packet to the database requesting the data relating to the three-dimensional structure and the database is adapted to transmit the data to the user interface responsive to receiving the information packet.

11. The system of claim 8 wherein the user interface connects to the database over an Internet Protocol network or other network.

12. The system of claim 8 wherein the Interest Value Engine utilizes a time-based approach to analyze the at least one three-dimensional representation of the data on which a user is currently or presently focused in time to determine the user's relative interest in the at least one three-dimensional representation of the data.

13. The system of claim 8 wherein the galaxy controller further comprises software code for a system forces application component, the system forces application component adapted to apply forces on the at least one three-dimensional representation of the data when the user zooms the at least one three-dimensional representation of the data into system view.

14. The system of claim 8 wherein the galaxy controller further comprises software code for a galaxy forces application component, the galaxy forces application component adapted to apply forces on the at least one three-dimensional representation of the data when the user zooms the at least one three-dimensional representation of the data into galaxy view.

15. A three-dimensional network mapping system for three-dimensional mapping of data nodes to render data visually navigable and highlight useful relationships in that data, comprising:

a database;

a computer configured to execute:

software code for a data gathering system interfacing with the database, the data gathering system adapted to gather data and send that data to the database;

software code for a user interface interfacing with the database, the user interface adapted to form a three-dimensional (3D) representation of the data by orienting the data in an organized three-dimensional (3D) structure representing a layout of the data in an organized three-dimensional (3D) structure representing a layout of the data in three-dimensional (3D) space and the user interface including:

a network controller interfacing with the database;

software code for a galaxy controller interfacing with the network controller, the galaxy controller having:

software code for a progenitor component interfacing with the network controller, the progenitor component adapted to load a predetermined starting data node;

software code for a spawn domain component interfacing with the progenitor component and adapted to place the data nodes into three-dimensional (3D) space, the galaxy controller adapted to coordinate relationships of the data nodes to each other in the three-dimensional (3D) space;

software code for a data recipient component interfacing with the network controller and the spawn domain component, the data recipient component adapted to receive data from the network controller and transmit the data to the spawn domain component;

software code for a domain controller interfacing with the spawn domain component and the data recipient component, the domain controller adapted to coordinate movement of the data nodes within the 3D space on the screen;

software code for a system forces application component, the system forces application component adapted to apply forces on a three-dimensional (3D) representation of a particular data node when the user zooms the particular data node into system view and facilitate three-dimensional attraction between the data nodes in the three-dimensional space when at least one of the data links is between the data nodes and three-dimensional repelling between non-linked data nodes in the three-dimensional space;

software code for a galaxy forces application component, the galaxy forces application component adapted to apply forces on the three-dimensional (3D) representation of the particular data node when the user zooms the three-dimensional (3D) representation of the particular data node into galaxy view; and software code for an Interest Value Engine interfacing with the network controller, the Interest Value Engine adapted to monitor usage and maintain a plurality of interest values corresponding to the plurality of data nodes that are periodically adjusted based on respective amounts of time each of the plurality of website domains has been selected by the user, wherein the Interest Value Engine is further adapted to: determine a first interest value associated with a first set of data based on an amount of time the first set of data has been currently selected by the user, determine a second interest value that is smaller than the first interest value of one or more other sets of data that are linked via one or more of the data links to the first set of data, normalize the first interest value and the second interest value across the first set of data and the one or more other sets of data linked to the first set of data that are currently monitored by the Interest Value Engine such that a total interest value assigned to the plurality of data nodes does not exceed a predefined cap, and transmit a request to the network controller to retrieve additional information on one of the first set of data and the one or more other sets of data when the one of the first set of data and the one or more other sets of data accumulates a certain interest value, the galaxy controller further adapted to organize the data nodes with respect to each other in the 3D space by using simulated physics forces;

software code for a domain concealment component interfacing with the galaxy controller and the Interest Value Engine, the domain concealment component adapted to hide a 3D representation of one of the other sets of data when it receives a message from the Interest Value Engine by disabling all display elements associated with the 3D representation of the one of the other sets of data, the Interest Value Engine being further adapted to send a message to the domain concealment component to remove the 3D representation of the one of the other sets of data from display when the second interest value of the one of the other sets of data falls below a predefined interest value;

software code for a domain display component interfacing with the galaxy controller, the domain display component adapted to enable display of at least one display element associated with the 3D representation of the first set of data, the Interest Value Engine being further adapted to send a message to the domain display component to display the 3D representation of the first set of data when the first interest value of the first set of data rises above the predefined interest value; and software code for a user input controller interfacing with the galaxy controller, the user input controller includes controls for expanding or contracting a field of view.

16. The system of claim 15 wherein the database comprises an open source, non-relational, distributed database infrastructure.

17. The system of claim 15 wherein the user interface is configured to transmit to the database an information packet to the database requesting the data relating to the three-dimensional structure and the database is adapted to transmit the data to the user interface responsive to receiving the information packet.

18. The system of claim 15 wherein the user interface connects to the database over an Internet Protocol network or other network.

19. The system of claim 15 wherein the domain controller includes:

software code for a hide domain component interfacing with the galaxy controller, the hide domain component adapted to hide the three-dimensional representation of the data node;

software code for a show domain component interfacing with the galaxy controller, the show domain component adapted to enable the three-dimensional representation of the data node;

software code for a build system component interfacing with the galaxy controller, the build system component adapted to create data nodes and place them in the three-dimensional space; and software code for a hide system component interfacing with the galaxy controller, the hide system component adapted to hide the data nodes from view.

20. A three-dimensional network mapping method for three-dimensional mapping of web pages to render data visually navigable and highlight useful relationships in that data, comprising:

obtaining data;

forming a three-dimensional (3D) representation of the data as a plurality of data nodes by orienting the data in an organized three-dimensional (3D) structure representing a layout of the data nodes in a three-dimensional space;

interfacing an Interest Value Engine with a network controller, wherein the Interest Value Engine:

monitoring a level of user interest and maintains a plurality of interest values corresponding to the plurality of data nodes that are periodically adjusted based on respective amounts of time each of the plurality of data nodes has been selected by a user;

determining a first interest value associated with a first data node of the plurality of data nodes based on an amount of time the first data node has been currently selected by the user, determines a second interest value that is smaller than the first interest value of one or more other data nodes linked via one or more data links to the first data node, normalizes the first interest value and the second interest value across the first data node such that a total interest value assigned does not exceed a predefined cap, and retrieves additional information on one of the first data node and the one or more other data nodes when one of the first data node and the other data nodes accumulates a certain interest value;

organizing the data nodes with respect to each other in the 3D space by using simulated physics forces;

facilitating three-dimensional attraction between the data nodes in the three-dimensional space when at least one of the data links is between the data nodes and three-dimensional repelling between non-linked data nodes in the three-dimensional space;

hiding a 3D representation of the first data node by disabling all display elements associated with the first data node when the first interest value falls below a predefined interest value; and enabling the 3D representation of the first data node by enabling all display elements associated with the first data node when the first interest value rises above the predefined interest value.

21. The method of claim 20 wherein obtaining data comprises providing a database and a data gathering system interfacing with the database, the data gathering system downloading data relating to the data nodes from the database.

22. The method of claim 21 wherein forming a three-dimensional representation of the data comprises forming a three-dimensional representation of the data using a user interface interfacing with the database.

23. The method of claim 22 wherein forming a three-dimensional representation of the data using a user interface interfacing with the database comprises forming a three-dimensional representation of the data using a user interface interfacing with the database over an Internet Protocol network.

24. The method of claim 22 further comprising transmitting an information packet from the user interface to the database, the information packet requesting the data relating to the data link structure between data nodes and further comprising transmitting the data from the database to the user interface responsive to the database receiving the information packet.

25. The method of claim 20 wherein obtaining data comprises obtaining the data from a dataset comprising a network of advertising data, data nodes comprise collected pieces of information about users that the network may want to facilitate advertising to, and data links representing similarities among data node characteristics wherein the characteristics are used to compare the data.

26. The method of claim 20 wherein obtaining data comprises obtaining the data from a dataset comprising financial transactions in a marketplace, data nodes comprise of inventory items carried at said marketplace, users of said marketplace, and/or purchases made at said marketplace, and data links representing similarities among data node characteristics wherein the characteristics are used to compare the data.

27. The method of claim 20 wherein obtaining data comprises obtaining the data from a dataset comprising financial transactions concerning transfers of money between banks, individuals, and other parties (collectively institutions, data nodes comprise of transfers made between said institutions and/or the institutions themselves, and data links representing similarities among data node characteristics wherein the characteristics are used to compare the data.

28. The method of claim 20 wherein obtaining data comprises obtaining the data from a dataset comprising websites and webpages on the internet, data nodes comprise of said websites and webpages, and data links representing similarities among data node characteristics wherein the characteristics are used to compare the data.

29. The method of claim 20 wherein obtaining data comprises obtaining the data from a dataset comprising a heuristic analysis of computer instructions and/or programming code, data nodes comprise of patterns and/or logical structures in said computer instructions or programming code, and data links representing similarities among data node characteristics wherein the characteristics are used to compare the data.

30. The method of claim 20 wherein obtaining data comprises obtaining the data from a dataset comprising information about a group of people or user accounts on a platform, data nodes comprising said people or accounts, and data links comprising friend groups, family groups, interest groups, or any other commonalities among data node characteristics wherein the characteristics are used to compare the data.

31. The system of claim 1 wherein the data gathering system obtains the data from a dataset comprising a network of advertising data, and data nodes comprise collected pieces of information about users that the network may want to facilitate advertising to, and data links representing similarities among data node characteristics wherein the characteristics are used to compare the data.

32. The system of claim 1 wherein the data gathering system obtains the data from a dataset comprising financial transactions in a marketplace, and data nodes comprise of inventory items carried at said marketplace, users of said marketplace, and/or purchases made at said marketplace, and data links representing similarities among data node characteristics wherein the characteristics are used to compare the data.

33. The system of claim 1 wherein the data gathering system obtains the data from a dataset comprising financial transactions concerning transfers of money between banks, individuals, and other parties (collectively institutions), and data nodes comprise of transfers made between said institutions and/or the institutions themselves, and data links representing similarities among data node characteristics wherein the characteristics are used to compare the data.

34. The system of claim 1 wherein the data gathering system obtains the data from a dataset comprising websites and webpages on the internet, and data nodes comprise of said websites and webpages, and data links representing similarities among data node characteristics wherein the characteristics are used to compare the data.

35. The system of claim 1 wherein the data gathering system obtains the data from a dataset comprising a heuristic analysis of computer instructions and/or programming code, and data nodes comprise of patterns and/or logical structures in said computer instructions or programming code, and data links representing similarities among data node characteristics wherein the characteristics are used to compare the data.

36. The system of claim 1 wherein the data gathering system obtains the data from a dataset comprising information about a group of people or user accounts on a platform, data nodes comprising said people or accounts, and data links comprising friend groups, family groups, interest groups, or any other commonalities among data node characteristics wherein the characteristics are used to compare the data.

* * * * *